United States Patent [19]

Funada et al.

[11] Patent Number: 4,556,287

[45] Date of Patent: Dec. 3, 1985

[54] FLUORESCENT LIQUID CRYSTAL DISPLAY DEVICES

[75] Inventors: Fumiaki Funada, Yamatokoriyama; Masataka Matsura, Tenri; Tomio Wada, Ikoma, all of Japan

[73] Assignee: Sharp Kabushiki Kaisha, Osaka, Japan

[21] Appl. No.: 524,475

[22] Filed: Aug. 19, 1983

Related U.S. Application Data

[63] Continuation of Ser. No. 935,246, Aug. 21, 1978, abandoned.

[30] Foreign Application Priority Data

| Aug. 29, 1977 | [JP] | Japan | 52-41019 |
| Aug. 29, 1977 | [JP] | Japan | 52-104040 |
| Nov. 7, 1977 | [JP] | Japan | 52-133848 |
| Feb. 3, 1978 | [JP] | Japan | 53-11588 |
| Feb. 3, 1978 | [JP] | Japan | 53-11589 |
| Feb. 3, 1978 | [JP] | Japan | 53-11590 |
| May 15, 1978 | [JP] | Japan | 53-57829 |

[51] Int. Cl.[4] ............... G02F 1/133; G02F 1/137
[52] U.S. Cl. ............... 350/336; 350/339 R; 350/345; 350/350 F
[58] Field of Search ............... 350/350 F, 339 F, 345, 350/338, 336, 96.14, 96.32, 339 R; 252/299.1, 299.01, 299.2

[56] References Cited

U.S. PATENT DOCUMENTS

| 3,814,501 | 6/1974 | Schindler | 350/338 |
| 3,824,003 | 7/1974 | Koda et al. | 350/333 |
| 3,912,366 | 10/1975 | Sprokel | 350/338 X |
| 3,960,753 | 6/1976 | Larrabee | 350/350 F |
| 4,116,544 | 9/1978 | Soref | 350/336 |
| 4,142,781 | 4/1979 | Baur | 350/350 F X |
| 4,208,106 | 6/1980 | Oh | 252/299.1 X |
| 4,337,999 | 7/1982 | Funada et al. | 350/345 |

Primary Examiner—John K. Corbin
Assistant Examiner—David Lewis
Attorney, Agent, or Firm—Birch, Stewart, Kolasch & Birch

[57] ABSTRACT

A fluorescent liquid crystal display device having a display area which comprises means for causing external excitation of the fluorescent liquid crystal display device, a fluorescent material which emits visible fluorescence, a liquid crystal material mixed with the fluorescent material, first means for preventing the propagation of the visible fluorescence toward a display area of the fluorescent liquid crystal display device while not being activated by the excitation means, and/or second means for enhancing the propagation of the visible fluorescence toward the display area of the same while being activated by the excitation means.

26 Claims, 23 Drawing Figures

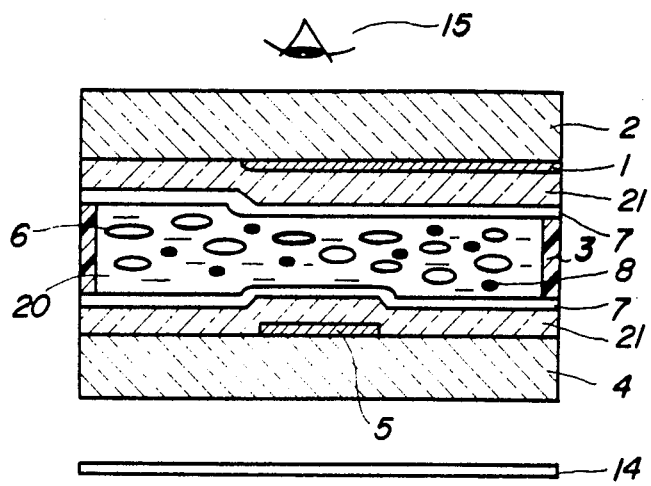
FIG. 17
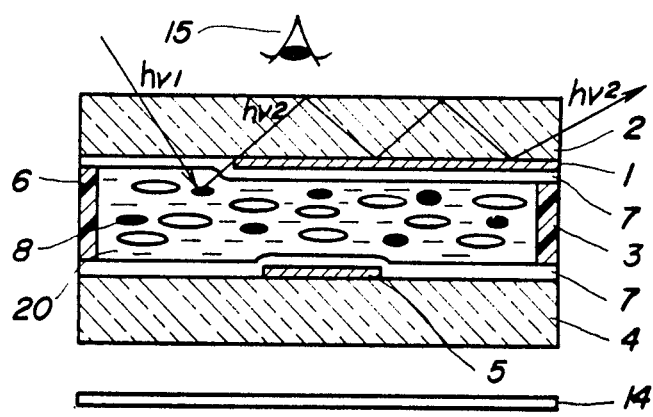
FIG. 18
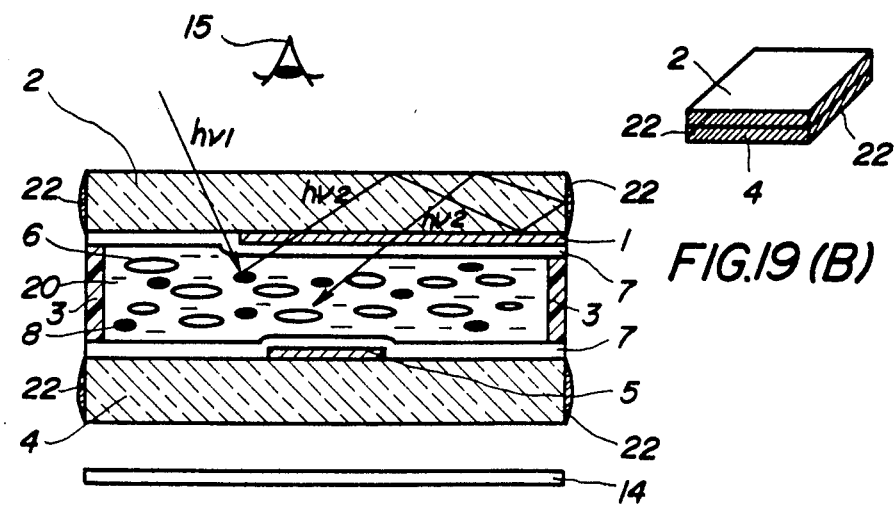
FIG. 19 (A)
FIG. 19 (B)

FLUORESCENT LIQUID CRYSTAL DISPLAY DEVICES

This application is a continuation, of application Ser. No. 935,246 filed on Aug. 21, 1978, now abandoned.

BACKGROUND OF THE INVENTION

The present invention relates to liquid crystal display devices and, more particularly to fluorescent liquid crystal display devices comprising a liquid mixture having liquid crystal display materials and fluorescent materials dissolved therein. Light scattering conditions are caused within the fluorescent liquid crystal display devices in response to external excitations such as an electric field, whereby visible the fluorescence emitted from the fluorescent materials is effectively emitted from the liquid crystal display device.

Generally known electro-optical effects of liquid crystals are a dynamic scattering effect, twisted nematic electric field effect, guest-host effect, cholesteric-nematic phase transition effect, etc. These electro-optical effects provide displays by the scattering or absorption of ambient light, as distinct from the effects of luminescent materials which per se produce luminescent displays such as lamp displays, luminescent diode displays, electroluminescence displays, plasma displays or the like. The displays utilizing the electro-optical effects are advantageous over those of the latter type in that they involve reduced energy consumption however, they have the drawback of lacking brilliance.

It has been proposed to add a fluorescent material to a liquid crystal material and vary the fluorescent intensity of the material by electric field (Larrabee, R. D., RCA Review, Vol. 34, P 329, 1973). However, this paper states that the author failed to find liquid crystal materials which do not absorb ultraviolet light at room temperature. This appears attributable to the fact that when causing a fluorescent material in a liquid crystal material to absorb a varying amount of light in accordance with the orientation of the liquid crystal to vary the fluorescence intensity with the light absorption, the exciting light is absorbed by the liquid crystal layer without effectively exciting the fluorescent material.

U.S. Pat. No. 3,844,637 discloses fluorescent liquid crystal compositions comprising 4'-methoxy-(or -ethoxy-)benzylidene-4-n-butylaniline as a liquid crystal material. However, the compositions per se absorb violet light or near ultraviolet light without permitting effective excitation of the fluorescent material.

OBJECTS AND SUMMARY OF THE INVENTION

The present invention has overcome the above problem and provides novel useful display devices which have the low power consumption characteristics of so-called passive displays not luminescent in themselves and which incorporates a self-luminescent component for giving a brilliant active display.

In view of the foregoing, it is an object of the present invention to provide novel luminescent display devices of the low power consumption type with use of liquid crystal materials which cause light scattering phenomena in response to external stimulation of an electric field, a magnetic field, thermal excitation or mechanical force in anyone of the nematic, smectic, and cholesteric mesophases.

It is another object of the present invention to provide novel luminescent display devices of the low power consumption type with the use of liquid crystal materials; whereby luminescent light developed from the luminescent display device is not scattered toward a display area of the luminescent display device when it is not activated.

It is still another object of the present invention to provide novel luminescent display devices of the low power consumption type with the use of liquid crystal materials, whereby the luminescent light generated from the luminescent display device is effectively scattered toward the display area of the luminescent display device which is activated.

It is yet another object of the present invention to provide novel luminescent display devices of the low power consumption type with the use of liquid crystal material of cholesteric mesophase and a fluorescent material capable of emitting visible fluorescence.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a fluorescent liquid crystal display device comprises a liquid mixture of both a liquid crystal material of either a nematic, smectic or cholesteric mesophases and a fluorescent material capable of emitting visible fluorescence. The liquid crystal material manifests the light scattering phenomena in response to an external excitation by an electric field, a magnetic field, rising temperature, a mechanical shock or the like. Excitation light for activating the fluorescent material and the visible fluorescence emitted from the same must both penetrate through the liquid crystal material enclosing the fluorescent material. Therefore, the visible fluorescence can be transferred toward a display area of the fluorescent liquid crystal display device while the fluorescent liquid crystal display device is being activated.

In another specific form of the present invention, the visible fluorescence emitted from the fluorescent material is prevented from scattering out of the display area of the fluorescent liquid crystal display device while the device is not being activated. For this purpose, a transparent film is deposited on a pair of opposing plates which contain the liquid crystal material and the fluorescent material therebetween. The transparent film has an index of refraction to the visible fluorescence higher than that of the pair of opposing plates. This arrangement causes total reflection of the visible fluorescence. More particularly, the transparent film is not arranged on the portion of the plates where a light scattering center is generated in response to the external excitation. Mirror face treatments are adopted at the edges of the transparent film, and, further, reflective layers can be formed at the edges of the transparent film.

Another way of restricting unnecessary scattering of the visible fluorescence out of the display area of the fluorescent liquid crystal display device while it is not activated, is to provide a second transparent film which is deposited on a pair of opposing plates which contain the liquid crystal material and the fluorescent material.

The refraction index of the second transparent film over the wave length of the emitted visible fluorescence is lower than that of the liquid crystal material. Mirror treatments can be similarly adopted to the edges of the fluorescent liquid crystal display device and, further, the reflective layers can be formed at the same.

In still another specific form of the present invention, the visible fluorescence emitted from the fluorescent material scatters effectively out of a display area of the fluorescent liquid crystal display device while being activated. For this purpose, high reflective layers are formed on the peripheral edges of the fluorescent liquid crystal display device. A background plate can be further enhanced in its reflection by adapting the mirror treatment on a display side surface of the background plate which has absorption spectra over a range of emission spectra of the fluorescent material.

In yet another specific form of the present invention, the liquid crystal materials selected are of the cholesteric mesophase whereby the fluorescent material can be effectively excited to provide superior indications of the fluorescent liquid crystal display device. As initial orientations of molecules of the liquid crystal materials of the cholesteric mesophase, Grandjean texture and focalconic texture are both available.

BRIEF DESCRIPTION OF THE DRAWINGS

The present invention will become more fully understood from the detailed description given hereinbelow and the accompanying drawings which are given by way of illustration only, and thus are not limitative of the present invention and wherein;

FIG. 17 is a cross-sectional view of a further fluorescent liquid crystal display device according to the present invention;

FIGS. 18 and 20 illustrate light propagation modes present in the fluorescent liquid crystal display device shown in FIG. 10;

FIGS. 19(A) and 19(B) are a cross-sectional view and a perspective view of a still further fluorescent liquid crystal display device according to the present invention, respectively.

DESCRIPTION OF THE PREFERRED EMBODIMENTS

Figure 1:
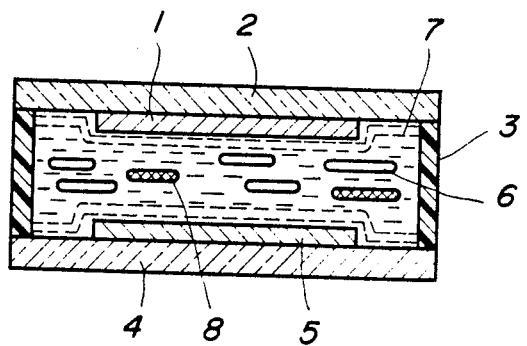
FIG. 1 is a cross-sectional view of a fluorescent liquid crystal display according to the present invention.

Display devices of the present invention substantially comprise at least one pair of electrodes, voltages applying means, and two parallel plates having a fluorescent liquid crystal composition placed therebetween. The device shown in FIG. 1 comprises a display electrode 1 made of a transparent material such as $In_2O_3$, $SnO_2$, $TiO_2$ or the like and adhered to the inner surface of a transparent support plate 2 of glass, quartz, acrylic resin, polyethylene or the like. The transparent support plate 2 is provided with a side wall 3 made of epoxy resin, silicone resin, frit glass, polymer or like sheet to form a container. Opposite to the transparent support plate 2 is a rear base plate 4 made of a transparent material or a reflective material.

In opposed relation to the display electrode 1, the rear base plate 4 is provided with a rear electrode 5 adhered to the inner surface of the base plate 4 and made of reflective material such as Al, Au, Cr, Ag or the like or transparent material such as $In_2O_3$, $SnO_2$, $TiO_2$ or the like. At least one of the rear base plate 4 or rear electrode 5 may be made of reflective material. The rear electrode 5 is desirably patterned. The container is filled with a liquid crystal material 6 in the form of a cholesteric mesophase. The display electrode 1 and rear electrode 5 in contact with the liquid crystal material 6 are convered with a liquid crystal molecule orientation layer 7 such as a rubbing layer of SiO, $SiO_2$ or the like, a layer of SiO, $SiO_2$ or the like formed by angular deposition, or a layer of surfactant having a long-chain alkyl or long-chain fluoroalkyl group or containing a silane compound having an amino group. The liquid crystal material 6 contains a two-color absorbing fluorescent material 8.

With reference to FIGS. 2 to 6, the principle of operation of the display device shown in FIG. 1 will now be described.

The liquid crystal material 6 substantially in a cholesteric mesophase having a great dielectric constant in the direction of the long axis, in other words, a positive dielectric anisotropy is represented by the formula (I)

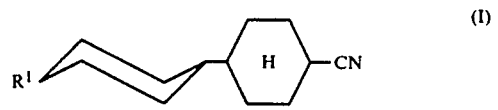

(I)

(trans-4-n-alkyl-4'-cyanophenyl-cyclohexane) wherein $R^1$ is normal alkyl of $C_3H_7$, $C_5H_{11}$, and $C_7H_5$.

Figure 4:
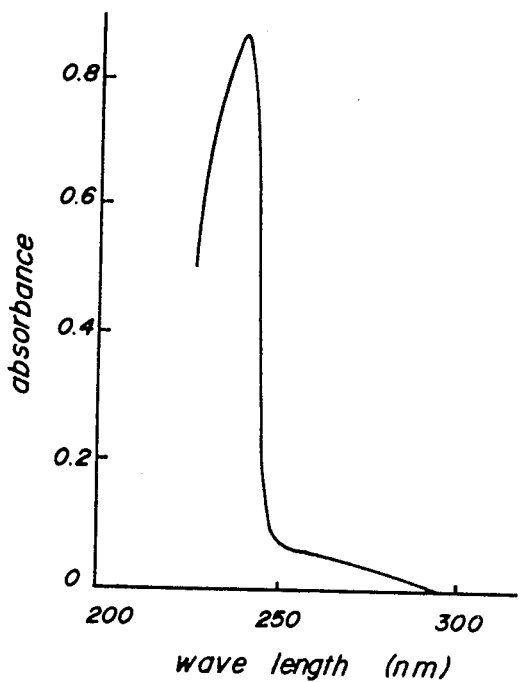
FIGS. 4 and 5 are graphical representations of absorbance properties of liquid crystal materials adapted to the present invention and the prior art, respectively.

FIG. 4 shows the wavelength dependency of the absorption spectra in the case where $R^1$ is $C_3H_7$. The data in the graphical representation of the FIG. 4 are plotted with wavelength, by the unit of nm, as ordinate and absorbance as abscissa, when the concentration of

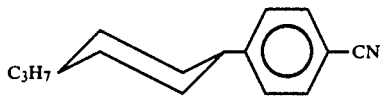

is 1 mg/100 ml and a the space between the transparent base plate 2 and the rear base plate 4.

It will be apparently observed that the liquid crystal material of

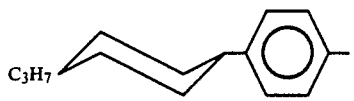

greatly absorbs light at wavelengths shorter than 250 nm with little or no near ultraviolet absorption and is, therefore, desirable as a solvent for the fluorescent material.

Figure 5:
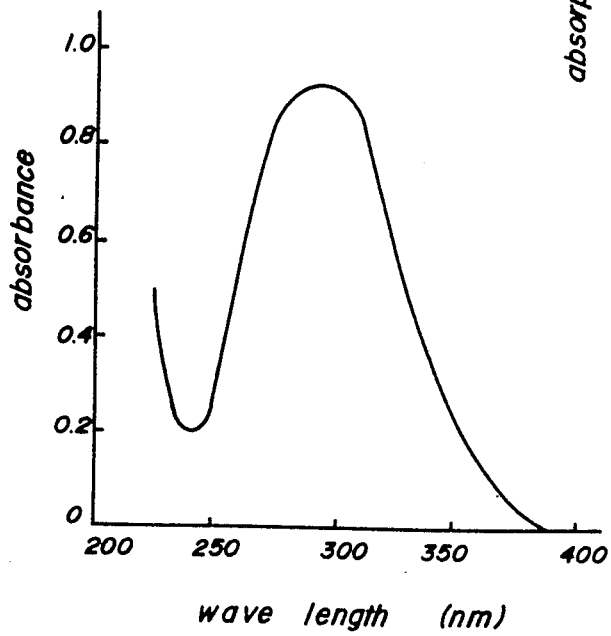

Similar results can be obtained by the remaining liquid crystal material 6 in the case where $R^1$ is $C_5H_{11}$ and $C_7H_{15}$. However, 4'-methoxy-benzylidene-4-n-butylaniline (MBBA) as shown in FIG. 5 under the same conditions as that of FIG. 4 with respect to the concentration, the thickness, and the solvents, absorbs light at wavelengths shorter that 350 nm and is not effective in exciting fluorescent materials.

Examples of fluorescent materials useful in this invention are usually aromatic compounds such as anthracene, tetracene, pyrene, Pyronin G, Pyronin B, Rhodamine 6G, perchlorate, cryptocyanine, Coumarin 6, Coumarin 7, Fluorescein, 9,10-dimethylanthracene, 9,10-diphenylanthracene, perylene, fluorene, p-quaterphenyl, rubrene, terphenyl, 2,5-diphenylfuran, 2,5-diphenyloxazole, 2-phenyl-5-(4-biphenylyl-1,3,4-oxadiazole, 1,4-bid[2-(5-phenyloxazolyl)]benzene, Samaron Brilliant Yellow H6GL, Brilliant Phosphine, Primulin 0, 1,8-diphenyl-1,3,5,7-octatetracene, Acridine Yellow, Thioflavine S, Pyronin GS, 1,12-benzperylene, etc. Useful materials, however, are not limited to these examples.

Figure 6:
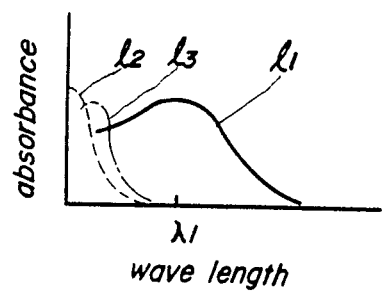
FIG. 6 is a graphical representation showing absorbance spectra of a fluorescent material adapted to the present invention.

Absorption spectra of fluorescent materials are generally anisotropic, and the absorption in the direction of the long axis often takes place at longer wavelengths than the absorption in the direction of the short axis as illustrated in FIG. 6 in which indicated at $l_1$ is the absorption spectrum of a fluorescent material in the direction of the long axis, at $l_2$ that in the direction of the short axis and at $l_3$ the absorption spectrum of a liquid crystal material in the direction of the long axis. The wavelength is plotted as abscissa vs. the absorbance as ordinate.

Figure 2:
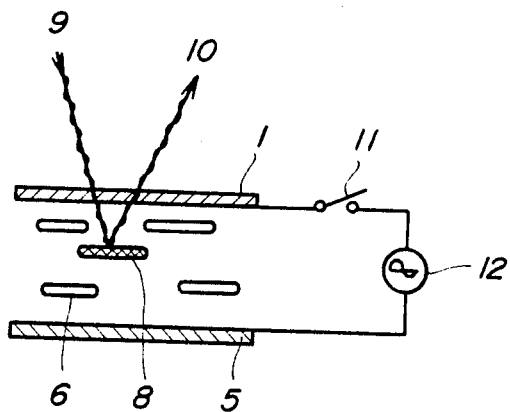
FIGS. 2 and 3 depict display principles of the fluorescent liquid crystal display of FIG. 1 in the absence and presence, respectively, of an applied electric field.
Figure 3:
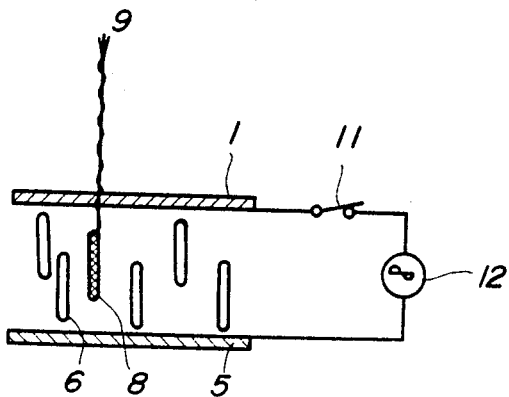

Incident exciting light having a wavelenght $\lambda_1$ at which the absorbance of $l_1$ is substantially the highest is applied to the display device shown in FIG. 1. When the direction of electric field oscillation of the incident light 9 is parallel to the long axis of the fluorescent material as shown in FIG. 2, the material absorbs the exciting light 9 according to the absorption specturm $l_1$ of FIG. 6, emitting fluorescence 10, whereas if it is in parallel to the short axis as seen in FIG. 3, the material does not absorb the exciting light 9 of wavelength $l_1$ according to the absorption spectrum $l_2$ of FIG. 6 and does not emit fluorescence. These two optical modes are utilized in the display device of this invention. Thus the display electrode 1 and rear electrode 5 are connected to an a.c. power supply 12 via a switch 11 to apply voltage to the liquid crystal composition in the container across the electrodes 1 and 5 for the control of the two optical mode. With application of voltage, the liquid crystal material is oriented as shown in FIG. 3, while when the device is de-energized, the material resorts to the orientation of FIG. 2.

Figure 7:
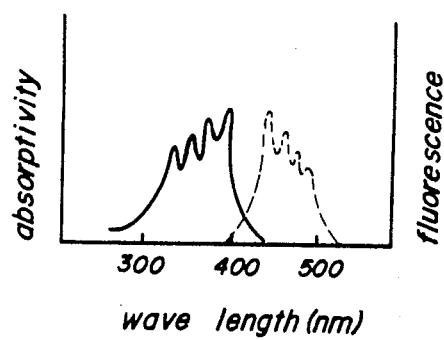
FIG. 7 is a graphical representation showing emission and absorbance spectra of a fluorescent material of anthracene which is a kind of fluorescent materials adapted to the present invention.

Since the fluorescence spectrum and absorption spectrum exhibit specular characteristics, the fluorescence of desired color can be obtained with use of a fluorescent material having an absorption specturm corresponding to the desired fluorescent color. The fluorescence spectrum and absorption spectrum of anthracene are shown in FIG. 7 in which the wavelength is plotted as abscissa vs. the absorptivity and fluorescence intensity as ordinate. The absorption spectrum is indicated in the solid line, and the fluorescence spectrum in the broken line.

The device of FIGS. 2 and 3 incorporates a liquid crystal material having a positive dielectric anisotropy to utilize horizontal orientation Grandjean texture with the cholesteric mesophase as the initial orientation. Alternatively this invention can be embodied with use of liquid crystal materials having a negative dielectric anisotropy utilizing vertical orientation as the initial orientation. With liquid crystal materials having a cholesteric mesophase, focal-conic texture can be utilized.

Figure 8:
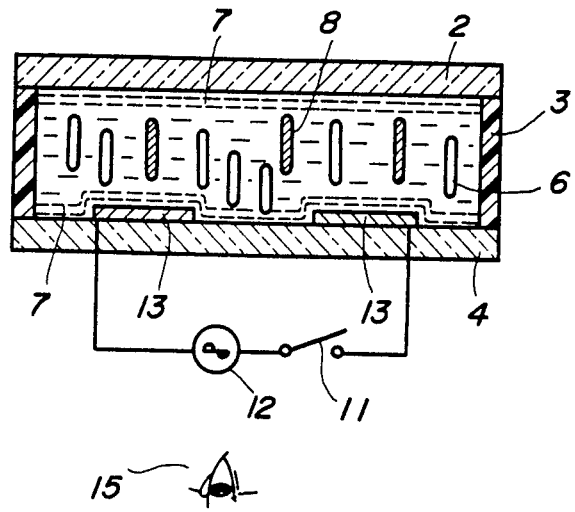
FIG. 8 is a cross-sectional view of another fluorescent liquid crystal display device according to the present invention.

While the display device of FIG. 1 has an electrode arrangement of the sandwich type, the display device shown in FIG. 8 includes an electrode arrangement of the interdigital type. In these drawings, like parts are referred to by like reference numerals.

A transparent base plate 2, a side wall 3 and a rear base plate 4 provide a container filled with a liquid crystal material 6 and a fluorescent material 8. A pair of electrodes 13 attached to the inner surface of the rear base plate 4 are connected to an a.c. power supply 12 through a switch 11. When the liquid crystal material has a positive dielectric anisotropy, vertical orientation is utilized as the initial orientation, while if it has a negative dielectric anisotropy, horizontal orientation is utilized. When a liquid crystal material is used whose dielectric anisotropy is changeable with frequency instead of using the switch 11, the orientation can be switched with the variation of frequency. This is also useful for the sandwich-type electrode arrangement.

Although the foregoing devices utilize the electric field effect due to the dielectric anisotropy to change the orientation of the fluorescent material 8, the orientation is changeable also by utilizing the anisotropy of conductivity. This requires the use of a frequency f such that $f < \sigma_{\parallel}/\epsilon_{\parallel}\epsilon_O$ wherein $\sigma_{\parallel}$ is the conductivity in the direction of the long axis of the liquid crystal molecules, $\epsilon_{\parallel}$ is relative dielectric constant in the same direction and $\epsilon_O$ is dielectric constant of vacuum.

The liquid crystal material 6 can be selected from the following liquid crystal materials or the like having a cyclohexane structure replaced for the above-mentioned formula.

wherein $R^1$ is the normal alkyl of $C_3H_7$, $C_{51}H_{11}$, and $C_7H_{15}$.

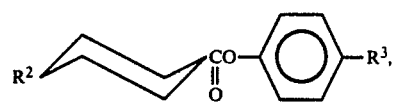

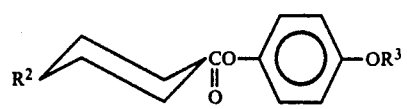

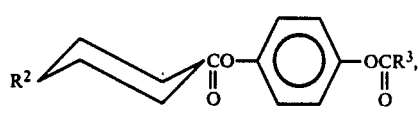

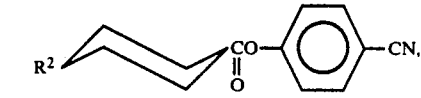

wherein $R^2$ and $R^3$ are alkyl having 3 to 9 carbon atoms. The alkyl with a side chain which is electro-optical activity type can be replaced by the same of the normal type.

The following Table 1 summarizes temperature ranges with respect to specific liquid crystal materials, respectively. In Table 1, a temperature for transforming the liquid crystal material from nematic mesophase to a crystal is depicted as TNC and another temperature for transforming it from the nematic mesophase to a liquid as TNI.

TABLE 1

| liquid crystal material | $T_{NC}$(°C.) | $T_{NI}$(°C.) |
|---|---|---|
| $C_5H_{11}$—CO—O—OC$_5H_{11}$ | 28 | 70 |
| $C_5H_{11}$—CO—O—CN | 30 | 87 |

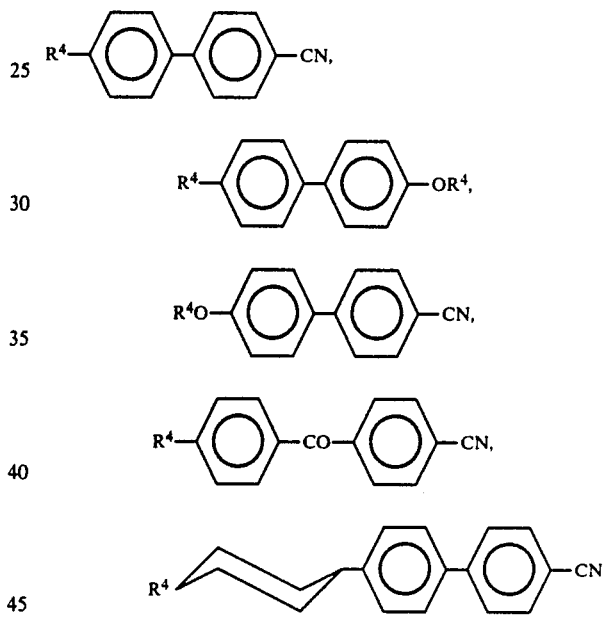

TABLE 1-continued

| liquid crystal material | $T_{NC}$(°C.) | $T_{NI}$(°C.) |
|---|---|---|
| $C_3H_7$—⟨⟩—CN | 42 | 45 |
| $C_5H_{11}$—⟨⟩—CN | 30 | 55 |
| $C_7H_{15}$—⟨⟩—CN | 30 | 57 |

Utilizing the above-mentioned liquid crystal materials described in Table 1, of course, a liquid crystal material mixed with a desired number of the liquid crystal materials is available. Moreover, for example, the following liquid crystal materials which have an absorption edge in the shorter wavelength side can be adopted for mixing purposes.

wherein $R^4$ is alkyl having 3 to 9 carbon atoms.

However, the above-mentioned auxiliary liquid crystal materials should be preferably mixed below three tenths (0.3) of the sum of the liquid crystal materials having cyclohexane structure because the auxiliary liquid crystal materials mixed beyond three tenths (0.3) thereof have a tendency to cancel the features of the liquid crystal with cyclohexane structure.

Figure 9:
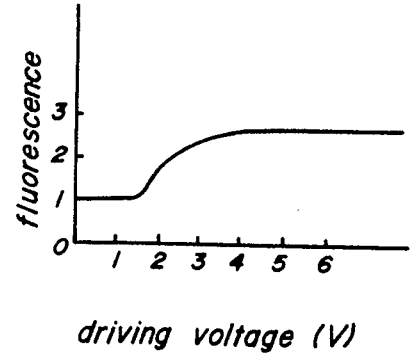
FIG. 9 is a graphical representation showing contrast properties of the fluorescent liquid crystal display device illustrated in FIG. 8.

The characteristics of devices of this invention will be described below. FIG. 9 shows the contrast characteristics of a display device as shown in FIG. 8 and incorporating a liquid crystal mixture, ZLI-1083, type produced by Merck & CO., Inc.

The ZLI-1083 type liquid crystal is a mixture of 4'-n-propylcyclohexyl-4-cyanobenzene, 4'-n-pentylcyclohexyl-4-cyanobenzene and 4'-n-heptylcyclohexyl-4-cyanobenzene, $T_{CN}-3°$ C., $T_{NI}=51°$ C., (20° C.)=21.0 c.p., $\epsilon=15.2$, $\epsilon=5.1$ where $T_{CS}$ is the transition temperature at which the crystal changes in a smectic phase, $T_{SN}$ is the transition temperature at which the smectic phase changes to a nematic phase, (20° C.) is the viscosity at 20° C., $\epsilon$ is the specific inductive capacity in the direction of the long axis, and $\epsilon$ is the specific inductive capacity in the direction of the short axis. In FIG. 9, the effective value of a.c. voltage applied is plotted as abscissa vs. the intensity of fluorescence as ordinate.

Test results are given below.

A liquid crystal mixture, ZLI-1083 (FIG. 9), was used with 0.02% by weight of a fluorescent materials, Samaron Brilliant Yellow H6GL, added to the mixture. The liquid crystal mixture had a thickness of 10 μm and a temperature of 25° C. A high-pressure mercury lamp was used for excitation. The device was tested for response characteristics at 5 volts at wavelength of 590 nm, with the result that the rise time was 50 m. sec. and decay time was 60 m. sec.

Thus the present invention provides novel display devices which have the low power consumption characteristics of passive displays and which incorporate a self-luminescent component for giving an active display of outstanding characteristics. The devices are therefore useful for producing displays on a wide variety of apparatus such as portable or desk-model calculators, table clocks, wrist watches, meters, thermometers, etc.

Since the liquid crystal materials are cholesteric mesophase, fluorescent displays are splended by assuring the control of the generation and absence of the fluorescence. Moreover, multiplex drivings are available for the liquid crystal materials of cholesteric mesophase using memory characteristics of the liquid crystal materials.

Although this invention has been described above as embodied in the form of display devices of the reflecting type, the invention can be embodied as those of the permeable type in which the electrodes and base plates are all transparent and which may be advantageously used in combination with an exciting light source.

Figure 10:
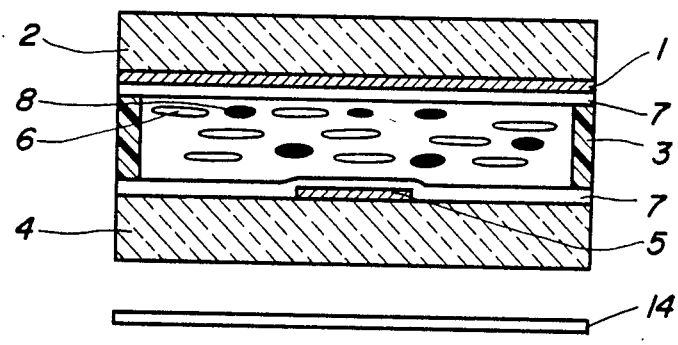
FIG. 10 is a cross-sectional view of still another fluorescent liquid ctystal display device similar in all respects to the same of FIG. 1 except for the arrangement of a background plate for the fluorescent liquid crystal display device in accordance with the present invention.

Turning to the drawings again, FIG. 10 shows another fluorescent liquid crystal dislay device wherein the filled liquid crystal material causes light scattering phenomena in response to external excitation of an electric or magnetic field, thermal rising, or a mechanical shock irrespective of its mesophase such as nematic, chloresteric, or smectic. More particularly, for example, the light scattering phenomena are: a dynamic scattering mode of the liquid crystal materials where an electrolyte such as quartenary ammonium salt is added to the nematic liquid crystal materials with a negative dielectric anisotropy; a memory effect of the mixed liquid crystal material comprising the nematic and cholesteric liquid crystal materials; and a phase transition effect that the liquid crystal material causes the transformation from the Grandjean textures of the cholesteric mesophase to the focalconic textures of the same and finally to the nematic mesophase.

The liquid crystal materials adopted to the fluorescent liquid crystal display device shown in FIG. 10 contain various additive for giving a predetermined conductivity, activating agents for controlling pitches of the cholesteric mesophase, or orientation agents for causing the orientation of the liquid crystal mateirals.

To effectively provide the fluoresence in response to the incident light for excitation purposes, the liquid crystal material should propagate both the incident light and the fluoresence.

FIG. 10 shows the fluorescent liquid crystal display device similar to that of FIG. 1 in all respects except for the arrangement of a background plate 14 for the fluorescent liquid crystal display device. Like elements corresponding to those of FIG. 1 are indicated by like numerals. There is no requirement that the fluorescent material 8 be dichroic.

The background plate 14 is preferably a colored plate which has an absorption spectra substantially at the emission spectra of the same as the fluorescent material 8 to thereby provide clearer display properties.

Figure 11:
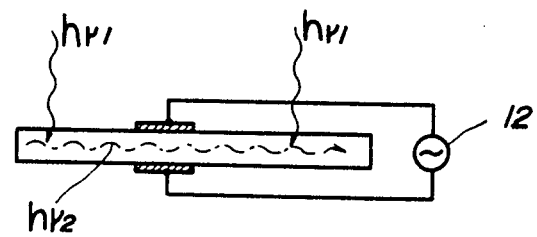
FIGS. 11 and 12 depict the display principles of the fluorescent liquid crystal display device shown in FIG. 10 in the absence and presence, respectively, of an applied electric field.
Figure 12:
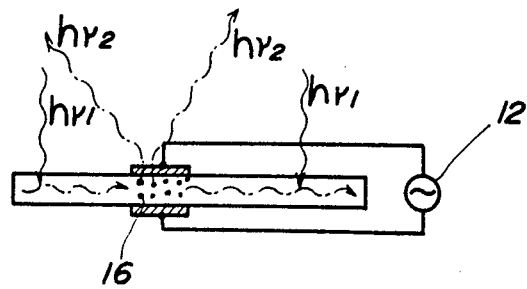

FIGS. 11 and 12 depict display principles of the fluorescent liquid crystal display device shown in FIG. 10 in the absence and presence, respectively, of an applied electric field.

Referring now to FIG. 11, although the fluorescent material 8 provides the fluorescent hν2 in response to the incident light hν1, the liquid crystal material 6 containing the fluorescent material 8 therein is several to several tens of microns in thickness and, therefore, the fluorescence can not be accumulated in the direction of width of the fluorescent liquid crystal display device.

In a direction orthogonal to that of the width of the device, on the other hand, the fluorescence can be accumulated because of the presence of the liquid crystal material 6 with a width of several mm to several cm. However, the fluorescence is prevented from being emitted from the display area of the fluorescent liquid crystal display device owing to the uniform orientation of the liquid crystal material 6. The fluorescence is reduced by the liquid crystal material 6. This is called the "dark condition" of the fluorescent liquid crystal display device.

Referring now to FIG. 12, a light reflective or a light scattering center 16 causes the fluorescence hν2 to be emitted from the display area of the fluorescent liquid crystal display device so that a viewer 15 can observe the display. The light reflective or a light scattering center 16 is generated in accordance with the above-mentioned light scattering phenomena.

EXAMPLE 1

A specific fluorescent liquid crystal display device examined is one where the transparent base plate 2 and the rear base plate 4 are both glass, the display electrode 1 and the rear electrode 5 are both made of $In_2O_3$, and the side wall 3, as a spacer member, comprises epoxy resin. The liquid crystal molecular orientation layer 7 comprises a rubbing layer made of $SiO_2$ and the background plate 14 is a black colored paper. The liquid crystal material 6 is a cholesteric mesophase which comprises a biphenyl liquid crystal material E-8 produced by BDH chemicals Ltd. and the optically active substance, CB-15 produced by the same at 10% by weight. The fluorescent material 8 is Pyronin B. Under the circumstances, the display indications are colored light pink and the contrast ratio is 10:1.

EXAMPLE 2

Another specific fluorescent liquid crystal display device is composed as the same as Example 1 except for the background plate 14, the liquid crystal material 6, and the fluorescent material 8. The background plate 14 comprises a blue colored paper and the fluorescent material 8 is Rhodamine 6G. The liquid crystal material 6 comprises MBBA

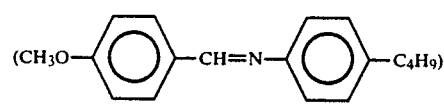

with 10% by weight of the following material.

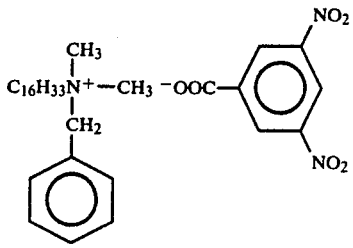

The liquid crystal material 6 further includes P-ethoxybenzylidene-P'-butylaniline.

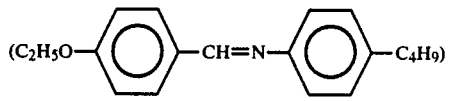

Under the circumstances, the display indications are colored orange and the contrast ratio is 5:1.

In another preferred form of the present invention, the visible fluorescence emitted from the fluorescent material 8 is prevented from scattering out of the display area of the fluorescent liquid crystal display device while not being activated as described hereinbelow. In FIG. 10 the fluorescence emitted from the fluorescent material 8 tends to scatter out of the transparent base plate 2 and the rear base plate 4, whereby it does not effectively reach the light scattering center 16 thereby not providing a sufficient display contrast.

For eliminating the above-mentioned defects, a transparent film with high refractive index is provided for causing total reflection of the fluorescence scattered out of the crystal material layer so that the fluorescence can reach the light scattering center with accuracy. The transparent film is arranged on the transparent base plate 2. This arrangement enhances the display contrast considerably.

Figure 13:
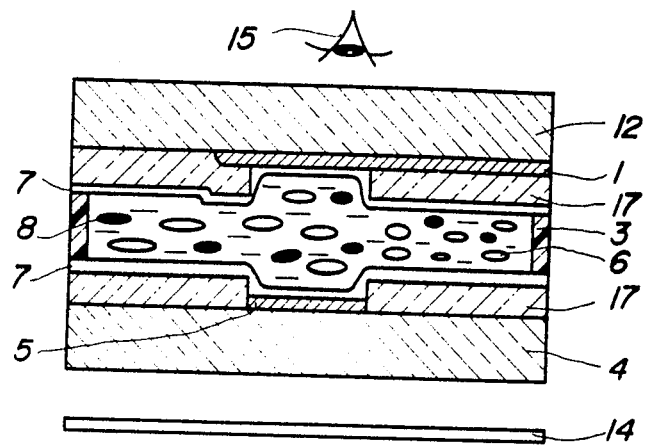
FIG. 13 is a cross-sectional view of yet another fluorescent liquid crystal display device according to the present invention.

FIG. 13 illustrates the fluorescent liquid crystal display device with a transparent films 17 each arranged on the transparent support plate 12 and the rear base plate 4. Like elements corresponding to those of FIG. 10 are indicated by like numerals. The transparent film 17 has a feature that the refractive index of the film 17 is higher than that of the transparent support plate 12 and the rear base plate 4 over the fluorescence wavelength range.

Figure 14:
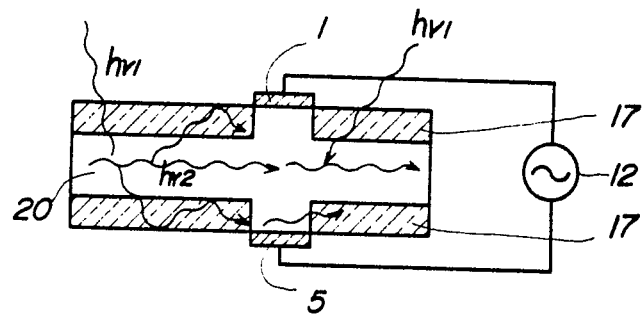
FIGS. 14 and 15 depict the display principes of the fluorescent liquid crystal display device shown in FIG. 13 in the absence and presence, respectively, of an electric field.
Figure 15:
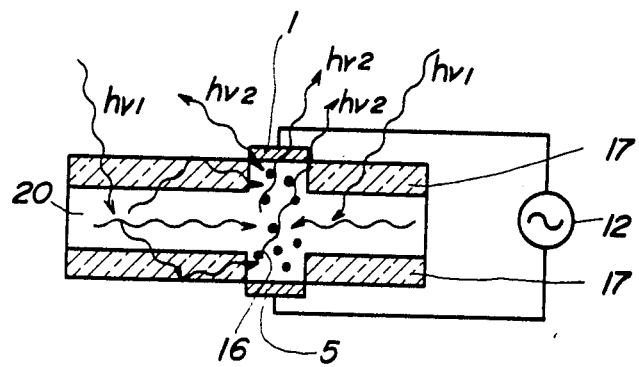

FIGS. 14 and 15 depict the display principles of the fluorescent liquid crystal device shown in FIG. 13 in the absence and presence, respectively, of an electric field.

The fluoresence can be accumulated in a direction orthogonal to that of the width of the fluorescent liquid crystal display device in a layer 20 of both the liquid crystal material 6 and the fluorescent material 8 and the transparent film 17 as previously described. As best shown in FIG. 14, the fluorescence is prevented from scattering from the display area of the fluorescent liquid crystal display device by the layer 20 and the transparent film 17. This is called the "dark condition" of the fluorescent liquid crystal display device.

As best shown in FIG. 15, on the other hand, the fluorescence hν2 is scattered out of the display area by the light scattering center 16, the fluorescence being confined within the layer 20 or the transparent film 17.

This is called the "display indication" of the fluorescent liquid crystal display device.

When the fluorescent liquid crystal display device is the reflecting type, the display device is characterized in that the display area must propagate both the excitation light for the fluorescent material 8 and the fluorescence emitted from the same. Needless to say, the remaining materials of the fluorescent liquid crystal display device except for the display area is not required to propagate the above excitation light and fluorescence.

In the permeable type, on the other hand, the transparent base plate 2 should propagate the fluoresence and there is no requirement for it to be transparent to the excitation light. The rear base plate 4 from which the excitation light is applied to the fluorescent liquid crystal display device should propagate the excitation light. Of course, no requirement exists for the rear base plate 4 to propagate the excitation light.

The following are acceptable materials for the transparent film 17, although the film 17 is not limited to these examples.

$Al_2O_3$(n: refractive index=16.3), $Sb_2O_3$(n=2.0), $Sb_2S_3$(n=3.01), $Bi_2O_3$(n=2.4), CdSe(n=2.33), CdS(n=2.4), CdTe(n=2.6), $CeF_3$(n=1.7), $CeO_2$(n=2.1), $Cr_2O_3$(n=2.4), $HfO_2$(n=2.0), $PbF_2$(n=1.75), MgO(n=1.7), $Nb_2O_5$(n=1.9), SiO(n=1.9), $Ta_2O_5$(n=2.1), $SnO_2$(n=2.1), $TiO_2$(n=2.4), $Y_2O_3$(n=1.8), ZnSe(n=2.6), ZnS(n=2.3), $ZrO_2$(n=2.1).

The transparent film 17 can be deposited in accordance with a vacuum evaporation, Chemical Vapour Deposition (CVD), sputtering techniques, film coating, or the adhesion of films. Furthermore, the transparnt film 17 comprises a plurality of films made of the above materials or can be composed so that a layer of the transparent film 17 has continuously changed refractive indices. It is preferably that the transparent film 17 is arranged at the remaing portion except for the portion where the external excitation such as an electric field is applied. This is so the fluorescence can effectively reach the light scattering center 16.

Figure 16:
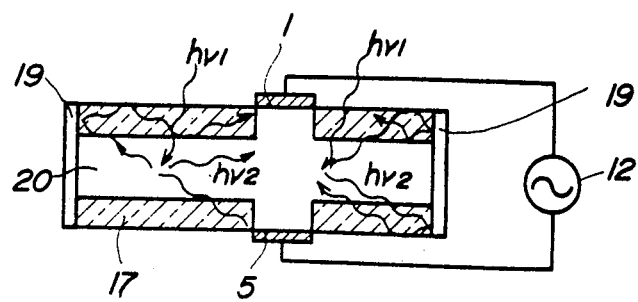
FIG. 16 depicts an application of the fluorescent liquid crystal display device shown in FIG. 13.

FIG. 16 illustrates an application of the fluorescent liquid crystal display device shown in FIG. 13, wherein a reflective layer 19 is provided at the peripheral edges of the transparent film 17. Mirror face treatment, otherwise, can be applied to the same. This arrangement causes the fluorescence at the periphery of the display device to scatter toward the light scattering center 16.

EXAMPLE 3

In FIG. 13, the fluorescent liquid crystal display device is examined where the transparent base plate 2 and the rear base plate 4 are made of soda glass with 1.7 mm thickness, the display electrode 1 and the rear electrode 5 are both made of $In_2O_3$, and the liquid crystal molecular orientation layer 7 is a layer made of $SiO_2$ coated with the orientation agents, Acid-T produced by Merck & Co., Inc.

The liquid crystal material 6 shows a cholesteric mesophase which comprises a biphenyl liquid crystal material E-8 produced by BDH Chemicals Ltd. and the optically active substance, CB-15 manufactured by the same at 10% by weight. The liquid crystal material 6 of the cholesteric mesophase is characterized in that a refractive index $n^\perp$ is 1.52 in the direction of short axis of the liquid crystal molecules and another refractive index $n^\parallel$ is 1.75 in the direction of the long axis of the same. The fluorescent material 8 is Coumarin 7 manufactured by Eastman Kodak Co.

The transparent film 17 is made of $TiO_2$ deposited by vacuum evaporation with a thickness of, about 1 μm entirely over the base plate 2 and 4. The side wall 3 as the spacer member is made of epoxy resin mixed with glass fiber. The background plate 17 is a black colored paper. The thus composed fluorescent liquid crystal display provides blue coloration and the contrast ratio thereof is 20:1.

EXAMPLE 4

Another specific fluorescent liquid crystal display device is composed the same as Example 3 except for the background plate 14, the liquid crystal material 6, and the fluorescent material 8. The background plate 14 is a blue colored paper and the fluorescent material 8 is Rhodamine 6G perchlorate produced by Eastman Kodak Co., 0.5% by weight.

The liquid crystal material 6 comprises MBBA previously described with 0.1% by weight of the following material.

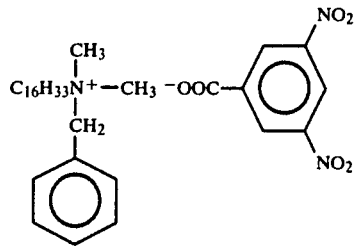

The liquid crystal material 6 further includes p-ethoxybenzylidene-P'-butylaniline.

The transparent film 17 is made of $HfO_2$ with a thickness of about 1 μm by vacuum evaporation and is arranged on the remaing portion except for the piston where the electric field is applied. Under the circumstances, the display indications are colored orange and the contrast ratio is 10:1.

Another way for the visible fluorescence emitted from the fluorescent material 8 to be prevented from scattering out of the display area of the fluorescent liquid crystal display device while not being activated is proposed in the arrangement of FIG. 17. Like elements corresponding to those of FIG. 13 are indicated by like numerals.

The fluorescent liquid crystal display device shown in FIG. 17 is characterized in that additional transparent films 21 are formed on the base plates 2 and 4, which have lower refractive index in the range of the fluorescence emitted from the fluorescent material 8 than that of the liquid crystal material 6. The transparent film 21 causes the fluorescence to be totally reflected to thereby propagate the layer 20 of the liquid crystal material 6 containing the fluorescent material 8 without any loss. The fluorescence results effectively in reaching the light scattering center 16 to enhance the display contrast.

The following are examples of materials suitable for the transparent film 21 with smaller refractive index than the liquid crystal material 6 although not limited to these example.

$BaF_2$(refractive index n=1.48), $CaF_2$(n=1.43), $Na_5Al_3F_{14}$(n=1.330), $Na_3AlF_6$(n=1.33), LiF(n=1.36), $MgF_2$(n=1.38), $SiO_2$(n=1.46), $SrF_2$(n=1.44).

The transparent film 21 can comprise a plurality of films made of the above examples or can be composed so that a layer of the transparent film 21 has continuously changed refractive indices. Using the above-mentioned examples of the transparent film 21, the base plates 2 and 4 or the liquid crystal molecule orientation layer 7 can be formed as a substitute for the transparent film 21. An example of the refractive index of the liquid crystal material 6 is a refractive index $n^\perp$ of 1.53 in the direction of the short axis of the liquid crystal molecules and another refractive index $n\|$ is 1.85 in the direction of the long axis of the same in 200 produced by Roche Inc.

EXAMPLE 5

Referring to FIG. 17, the fluorescent liquid crystal display device is composed in the same manner as that of Example 3 in all respects except that the transparent film 21 is the same as the transparent films 17 of FIG. 13.

The transparent film 21 is made of LiF with a thickness of about 1 μm which is vacuum evaporated on the base plates 2 and 4. This arrangement provides blue color and the contrast ratio is approximately 20:1.

It is preferable that the inner surfaces of the side wall 3 have mirror portions on the peripheral edges of the base plates 2 and 4, the transparent film 21, and the liquid crystal molecular orientation layer 7 undergo mirror treatment or have light reflective portions.

In still another preferred form of the present invention, the visible fluorescence emitted from the fluorescent material 8 is effectively scattering out of the display area of the fluorescent liquid crystal display device while being activated as described hereinbelow.

FIG. 18 depicts light propagation modes existing in the fluorescent liquid crystal display device shown in FIG. 10.

With reference to FIG. 18 the fluorescence developed from the layer 20 of the liquid crystal material 6 and the fluorescent material 8 penetrates the base plates 2 and 4 to cause total reflection of the fluorescence therein. Thereafter, the light scatters out of the peripheral edges of the fluorescent liquid crystal display device. Thus, scattering fluorescence does not contribute to the display characteristics of the display device.

To eliminate the above-mentioned unnecessary dissipation of the fluorescence, the arrangement of FIGS. 19(A) and 19(B) is proposed. The fluorescent liquid crystal display device is similar in all respects to that of FIG. 10 except for the feature that a high reflective layer 22 is formed at the periphery of the display device by vacuum evaporation or the like. The high reflective layer 22 is made of Al, Ni, Au, Cu, Ag, or the like. The fluorescence which propagates in the base plates 2 and 4 is reflected by the high reflective layer 22, whereby the fluorescence is scattering in the layer 20 again.

Simultaneously with the occurrence of the light scattering center 16 within the layer 20, in accordance with the electric field, the fluorescence scattered toward the display area is increased according to the high reflective layer 22 to enhance the display contrast.

EXAMPLE 6

Referring to FIGS. 19(A) and 19(B) the fluorescent liquid crystal device is composed in the same manner as that of Example 3 in all respects except for the high reflective layer 22 and the elimination of the transparent films 17 of FIG. 13. The high reflective layer 22 is made of Al with a thickness of 1,000 Å by vacuum evaporation. This arrangement provides blue color and the contrast ratio is 20:1.

Figure 21:
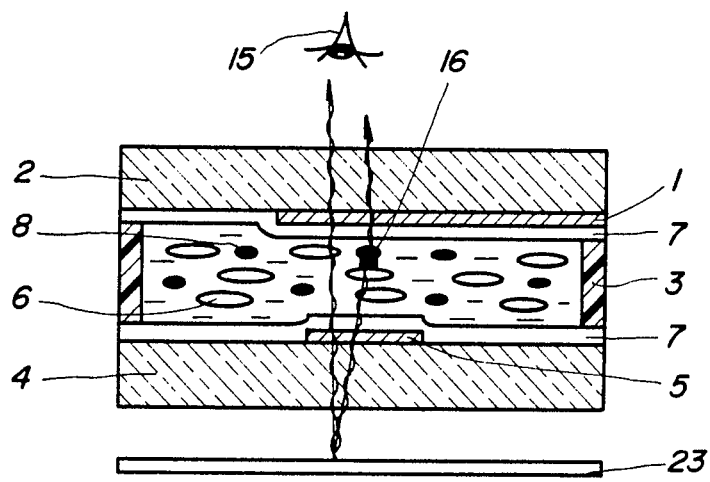
FIGS. 21 and 22 are cross-sectional views of yet further fluorescent liquid crystal display devices according to the present invention.
Figure 22:
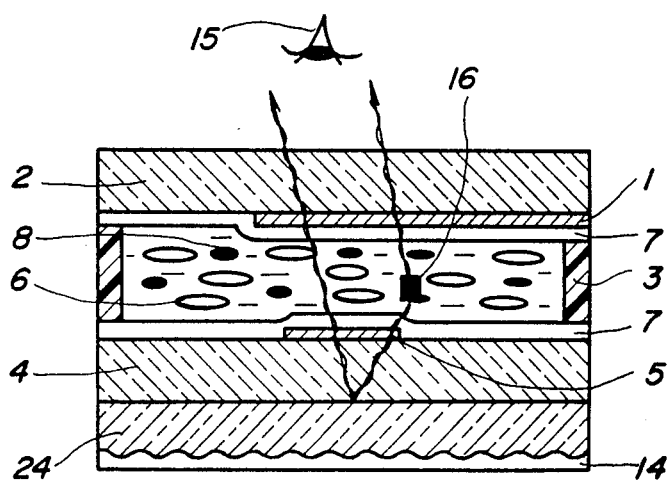

FIGS. 21 and 22 depict another way in which the visible fluorescence emitted from the fluorescent material 8 is effectively scattering out of the display area of the fluorescent liquid crystal display device while being activated.

Figure 20:
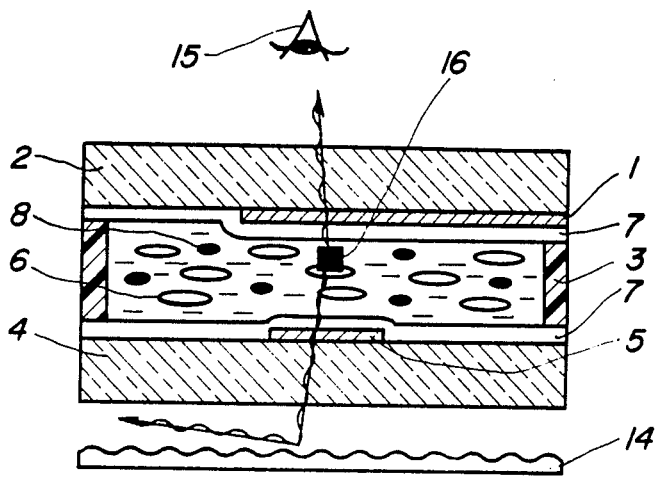

Referring back to FIG. 20, which illustrates the light propagation modes in the fluorescent liquid crystal display device shown in FIG. 10, the following loss of the fluorescence unavoidably exists in FIG. 20. The loss of the fluorescence results from non-reflective properties of the background plate 14 because the background plate 14 is made of a non-reflective material such as a colored paper. The viewer 15 can observe only the flourescence emitted directly from the light scattering center 16. In other words, the fluorescence scattered toward the rear base plate 4 can not be recognized by the viewer 15 because such fluorescence is diverging. This reduces the display contrast of the fluorescent liquid crystal display device.

The fluorescent liquid crystal display device of another type, shown in FIGS. 21 and 22, characterized in that a background layer 23 has reflective properties in accordance with mirror face treatment (FIG. 21) or a layer 24 with smaller refractive index than that of the base plate 4 is arranged on the background plate 14 (FIG. 22) so as to cause total reflection.

Referring now to FIG. 21, the background layer 23 is provided for reflecting the fluorescence from the light scattering center 16 toward the display area. The background layer 23 undergoes mirror face treatment to provide the same with reflective properties. Moreover, the incident light for exciting the fluorescent material 8 is reflected by the background layer 23 and scattered toward the display device to excite the fluorescent material 8 again, even when the incident light passes through the display device without any excitation of the same.

With reference to FIG. 22 the layer 24 with the refractive index smaller than that of the rear base plate 4 is provided for causing total reflection, the layer 24 being arranged between the rear base plate 4 and the background plate 14. This arrangement establishes the effects similar to FIG. 21. It is preferable for the background plate 14 or the background layer 23 to absorb predetermined visible light to enhance the display contrast. A black colored plate is most suitable for any color indications. Various plastic colored plates are suitable for the background plate 14 or the background layer 23. An example of the plastic colored plate is a colored acrylic acid resin plate Acrylite manufactured by Mitsubishi Rayon Inc.

The background layer 23 is made from any of the following materials by vacuum evaporation, sputtering techniques, CVD, film coating, or the like, although not limited to these materials. $BaF_2$(refractive index n=1.48), $CaF_2$(n=1.43), $Na_5Al_3F_{14}$(n=1.33), $Na_3AlF_6$(n=1.33), $LiF$(n=1.36), $MgF_2$(n=1.38), $SiO_2$(n=1.48), $SrF_2$(n=1.44).

EXAMPLE 7

Referring to FIG. 21, the fluorescent liquid crystal display device is composed in the same as that of Example 3 in all respects except for the background layer 23 and the removal of the transparent films 17 of FIG. 13. The background layer 23 is a black plastic plate Acrylite No. 502 manufactured by Mitsubishi Rayon Inc. This arrangement provides blue color indications and the contrast ratio is approximately 10:1.

While only certain embodiments of the present invention have been described, it will be apparent to those skilled in the art that various changes and modifications may be made therein without departing from the spirit and scope of the invention as claimed.

What is claimed is:

1. A fluorescent liquid crystal display device comprising an external excitation means, at least one pair of electrodes, parallel plates with adjoining sidewalls having a fluorescent liquid crystal composition therein containing a two-color absorbing fluorescent material capable of emitting visible fluorescence, depending upon the specific orientation of said fluorescent material, in response to incident radiation, said parallel plates comprising a transparent support plate and a rear base plate each having an inner surface and an outer surface, said at least one pair of electrodes comprising a display electrode of transparent material provided on said inner surface of said support plate and a rear electrode having a patterned configuration provided on said inner surface of said base plate such that said display and rear electrodes are in a facing relationship to each other, said base plate and rear electrode being made of a reflective material, and a liquid crystal molecular orientation layer formed at an interface between said respective electrodes and said liquid crystal composition, said display device further including a background plate positioned behind said rear base plate having an absorption spectra substantially the same as the emission spectra of said fluorescent material.

2. The display device of claim 1, wherein said device further includes transparent films arranged on each of said transparent support plate and said rear base plate, said transparent films each having a refractive index higher than that of said transparent support plate and said rear base plate over the wavelength range of said fluorescent material.

3. The display device of claim 2, further including high reflective layers peripherally to each of said transparent support plate and said rear base plate.

4. The display device of claim 2, further including reflective layers at peripheral edges of said transparent films.

5. The display device of claim 1, further including a layer on said outer surface of said rear base plate between said background plate and said base plate having a smaller refractive index than said base plate causing total reflection.

6. The display device of claim 1, wherein said device further includes transparent films arranged on each of said transparent support plate and said rear base plate, said transparent films each having a refractive index lower than that of the liquid crystal material over the wavelength range of said fluorescent material.

7. A fluorescent liquid crystal display device comprising an external excitation means, at least one pair of electrodes, parallel plates with adjoining sidewalls having a fluorescent liquid crystal composition therein containing a two-color absorbing fluorescent material capable of emitting visible fluorescence, depending upon the specific orientation of said fluorescent material, in response to incident radiation, said parallel plates comprising a transparent support plate and a rear base plate each having an inner surface and an outer surface, said at least one pair of electrodes comprising a display electrode of transparent material provided on said inner surface of said support plate and a rear electrode having a patterned configuration provided on said inner surface of said base plate such that said display and rear electrodes are in a facing relationship to each other, said base plate comprising a transparent material and said rear electrode comprising a reflective material, and a liquid crystal molecular orientation layer formed at an interface between said respective electrodes and said liquid crystal composition, said display device further including a background plate positioned behind said rear base plate having an absorption spectra substantially the same as the emission spectra of said fluorescent material.

8. The display device of claim 7, wherein said device further includes transparent films arranged on each of said transparent support plate and said rear base plate, said transparent films each having a refractive index higher than that of said transparent support plate and said rear base plate over the wavelength range of fluorescent material.

9. The display device of claim 8, further including high reflective layers peripherally to each of said transparent support plate and said rear base plate.

10. The display device of claim 7, further including a layer on said outer surface of said rear base plate between said background plate and said base plate having a smaller refractive index than said base plate causing total reflection.

11. The display device of claim 7, wherein said device further includes transparent films arranged on each of said transparent support plate and said rear base plate, said transparent films each having a refractive index lower than that of the liquid crystal material over the wavelength range of said fluorescent material.

12. A fluorescent liquid crystal display device comprising an external excitation means, at least one pair of electrodes, parallel plates with adjoining sidewalls having a fluorescent liquid crystal composition therein containing a two-color absorbing fluorescent material capable of emitting visible fluorescence, depending upon the specific orientation of said fluorescent material, in response to incident radiation, said parallel plates comprising a transparent support plate and a rear base plate each having an inner surface and an outer surface, said at least one pair of electrodes comprising a display electrode of transparent material provided on said inner surface of said support plate and a rear electrode having a patterned configuration provided on said inner surface of said base plate such that said display and rear electrodes are in a facing relationship to each other, said base plate comprising a reflective material and said rear electrode comprising a transparent material, and a liquid crystal molecular orientation layer formed at an interface between said respective electrodes and said liquid crystal composition, said display device further including a background plate positioned behind said rear base plate having an absorption spectra substantially the same as the emission spectra of said fluorescent material.

13. The display device of claim 12, wherein said device further includes transparent films arranged on each of said transparent support plate and said rear base plate, said transparent films each having a refractive index higher than that of said transparent support plate and said rear base plate over the wavelength range of said fluorescent material.

14. The display device of claim 13, further including high reflective layers peripherally to each of said transparent support plate and said rear base plate.

15. The display device of claim 12, further including a layer on said outer surface of said rear base plate between said background plate and said base plate having a smaller refractive index than said base plate causing total reflection.

16. The display device of claim 12, wherein said device further includes transparent films arranged on each of said transparent support plate and said rear base plate, said transparent films each having a refractive index lower than that of the liquid crystal material over the wavelength range of said fluorescent material.

17. A fluorescent liquid crystal display device comprising an external excitation means, at least one pair of electrodes parallel plates with adjoining sidewalls containing a fluorescent liquid crystal composition therein, said composition containing a two-color absorbing fluorescent material capable of emitting visible fluorescence, depending upon the specific orientation of said fluorescence material, in response to incident radiation, said parallel plates comprising a transparent support plate and a rear base plate each having an inner surface and an outer surface, said at least one pair of electrodes being of the interdigital type attached to the inner surface of said rear base plate in a patterned configuration, said base plate comprising a reflective material and said electrodes comprising a transparent material, and a liquid crystal molecular orientation layer formed at an interface between said electrodes and said liquid crystal composition, said display device further including a background plate positioned behind said rear base plate having an absorption spectra substantially the same as the emission spectra of said fluorescent material.

18. The display device of claim 17, wherein said device further includes transparent films arranged on each of said transparent support plate and said rear base plate, said transparent films each having a refractive index higher than that of said transparent support plate and said rear base plate over the wavelength range of said fluorescent material.

19. The display device of claim 18, further including high reflective layer peripherally to each of said transparent support plate and said rear base plate.

20. The display device of claim 17, further including a layer on said outer surface of said rear base plate between said background plate and said base plate having a smaller refractive index than said base plate causing total reflection.

21. The display device of claim 17, wherein said device further includes transparent films arranged on each of said transparent support plate and said rear base plate, said transparent films each having a refractive index lower than that of the liquid crystal material over the wavelength range of said fluorescent material.

22. A fluorescent liquid crystal display device comprising an external excitation means, at least one pair of electrodes, parallel plates with adjoining sidewalls containing a fluorescent liquid crystal composition therein, said composition containing a two-color absorbing fluorescent material capable of emitting visible fluorescence, depending upon the specific orientation of said fluorescence material, in response to incident radiation, said parallel plates comprising a transparent support plate and a rear base plate each having an inner surface and an outer surface, said at least one pair of electrodes being of the interdigital type attached to the inner surface of said rear base plate in a patterned configuration, said base plate comprising a transparent material and said electrodes comprise a reflective material, and a liquid crystal molecular orientation layer formed at an interface between said electrodes and said liquid crystal composition, said display device further including a background plate positioned behind said rear base plate having an absorption spectra substantially the same as the emission spectra of said fluorescent material.

23. The display device of claim 22, wherein said device further includes transparent films arranged on each of said transparent support plate and said rear base plate, said transparent films each having a refractive index higher than that of said transparent support plate and said rear base plate over the wavelength range of said fluorescent material.

24. The display device of claim 23, further including high reflective layers peripherally to each of said transparent support plate and said rear base plate.

25. The display device of claim 22, further including a layer on said outer surface of said rear base plate between said background plate and said base plate having a smaller refractive index than said base plate causing total reflection.

26. The display device of claim 22, wherein said device further includes transparent films arranged on each of said transparent support plate and said rear base plate, said transparent films each having a refractive index lower than that of the liquid crystal material over the wavelength range of said fluorescent material.

* * * * *